United States Patent Office 2,994,678
Patented Aug. 1, 1961

2,994,678
NITROGEN-CONTAINING CONDENSATION POLYMER, SOLUTION THEREOF, AND PROCESS OF MAKING SAME
Robert G. Parrish, Wilmington, Del., assignor to E. I. du Pont de Nemours and Company, Wilmington, Del., a corporation of Delaware
No Drawing. Filed Dec. 5, 1958, Ser. No. 778,292
8 Claims. (Cl. 260—30.8)

This invention relates to new and useful synthetic polymers. More particularly, it relates to a novel class of high molecular weight nitrogen-containing condensation polymers which may be formed into useful shaped structures.

Reactions of isocyanates with compounds containing active hydrogen atoms have been recognized for many years. These reactions may be characterized generally by the equation:

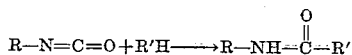

wherein R represents an organic radical and R′H represents a compound which has an active hydrogen atom, and which generally comprises an organic compound having a reactive center of which the active hydrogen is a part. Thus, many types of active hydrogen compounds may be reacted with isocyanates to form products predictable from the above equation. Further, it has long been recognized that the reaction between difunctional compounds, whose reactive centers are mutually compatible and capable of combination, may theoretically lead to the formation of polymeric substances. Inasmuch as the isocyanate grouping is reactive to many types of reagent, much work has been reported involving reactions of this type. Many of the polymers so formed have not had properties which were suitable for the formation of shaped structures therefrom. Frequently, they have been of low molecular weight and of limited stability.

It is an object of this invention to produce a novel class of high molecular weight nitrogen-containing polymers. It is a further object of this invention to produce a novel class of polymers which are capable of being formed into shaped structures. It is a still further object of this invention to provide a novel class of nitrogen-containing film- or fiber-forming polymers incorporating as recurring units within the polymeric chain a new and unique grouping of atoms.

In accordance with this invention, there is provided a novel high molecular weight nitrogen-containing condensation polymer comprising recurring units of the formula:

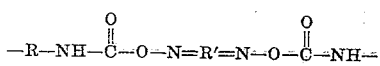

wherein R represents a divalent organic radical derived from a diisocyanate of the aliphatic, cycloaliphatic or aromatic type, or a mixture of such radicals, and R′ represents a tetravalent organic radical which contains the two carbonyl carbon atoms of a bifunctional aldehyde or ketone from which a dioxime is prepared, or a mixture of such radicals, which radicals may be further characterized by one of the following structural units:

(a)

or (b)
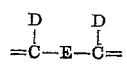

or (c)
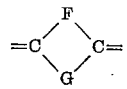

wherein D represents either a hydrogen atom or a simple monovalent organic radical; E represents a divalent organic radical of the aliphatic, aromatic, or aliphatic-aromatic type, or a mixture of such radicals; and F and G represent divalent organic radicals which may be the same or different and which, taken with the two carbonyl carbon atoms, form a cyclic structure. For film- and fiber-forming characteristics, a polymer having an inherent viscosity of at least about 0.2 preferred.

The polymers of this invention may be prepared by solution polymerization. In accordance with this process, a solution of a diisocyanate and a dioxime is stirred for a period of time ranging up to several hours at a temperature from about room temperature to about 130° C. During this time, the viscosity of the solution increases, indicating the formation of a polymeric composition. The reaction is frequently aided by the presence of a catalyst. The recovery and purification of the resulting polymer may be effected by the usual methods. As solvents for the polymerization reaction, dimethylsulfoxide, N,N-dimethylformamide, N,N-dimethylacetamide, tetramethylenesulfone, N-methylpyrrolidone, hexamethylphosphoramide, and other similar compounds in which both the starting materials and the polymeric product are soluble are suitable. The catalysts of utility may be tertiary amines as triethylamine, pyridine, and other like compounds; or they may be metallic salts as copper dichloride, or the salts of cobalt or ferric iron.

The diisocyanates which are of utility in this invention may be aliphatic diisocyanates, as ethylene diisocyanate, propylene diisocyanate, tetramethylene diisocyanate, pentamethylene diisocyanate, hexamethylene diisocyanate, and other higher members of this homologous series. Branched-chain aliphatic diisocyanates, as 3-methylhexane-1,6-diisocyanate or 3,3-dimethylpentane-1,5-diisocyanate, may also be used in the preparation of the polymers of this invention. The cycloaliphatic diisocyanates as, e.g., 1,4-cylohexane diisocyanate, may be employed. Among the aromatic diisocyanates which are of utility in this invention, the following are exemplary: m-phenylene diisocyanate, p-phenylene diisocyanate, and those which contain more than one aromatic nucleus as, for example, 4,4′-biphenylene diisocyanate, methylene bis-(4-phenyl isocyanate), 3,3′-dimethyl-4,4′-biphenylene diisocyanate, and 3,3′-dimethoxy-4,4′-biphenylene diisocyanate.

Among the dioximes which may be used in this invention are those derived from aliphatic dialdehydes as malonaldehyde, succinaldehyde, glutaraldehyde, adipaldehyde, and other members of this homologous series. Aliphatic diketones may be used in the preparation of the dioxime portion of the polymers of this invention as, for example, butane-2,3-dione, pentane-2,4-dione, hexane-2,5-dione, heptane-2,6-dione, heptane-3,5-dione, and other similar compounds. Any of the above compounds may also contain branching groups on the chain of carbon atoms joining the two carbonyl functions, as, e.g., those derived from 3-methylpentane-2,4-dione; 4,4-dimethylheptane-2,6-dione, 3-methylglutaraldehyde; and other similar dicarbonyl compounds. Cycloaliphatic dialdehydes and diketones as, for example, 1,4-cyclohexanedione; 1,2-cyclohexanedione; and hexahydroterephthaldehyde may be used in the preparation of the dioximes of utility in this invention. Among the aromatic dialdehydes and diketones, terephthaldehyde, isophthaldehyde, benzoquinone, and other similar dicarbonyl compounds may be converted to dioximes which are of utility. The dioxime derived from pyridine-2,6-dialdehyde and from other similar heterocyclic dialdehydes or diketones may be used in the preparation of the polymers of this invention. In general, any dicarbonyl compound which is capable of forming a dioxime may be used to form polymers of the type described herein. The inherent viscosity may be defined by the following formula:

$$n_{inh} = \frac{\ln n_{rel}}{c}$$

The $n_{rel}$ (relative viscosity) may be determined by dividing the flow time in a capillary viscometer of a dilute solution of the polymer by the flow time for the pure solvent. The concentration ($c$) is generally 0.5 gram of polymer per 100 ml. of solution, and the measurements are made at a temperature of 30° C.

Example I

To a solution of 5.80 grams of dimethylglyoxime in 30 ml. of dimethylsulfoxide is added a solution of 8.40 grams of hexamethylene diisocyanate in 30 ml. of dimethylsulfoxide, followed by 0.5 ml. of triethylamine. The resulting clear solution is stirred under nitrogen at a temperature of 80 to 90° C. for 1½ hours. After this period, a clear, tough, film is cast from one portion of the solution and dried in a forced-draft oven at 80° C. for 1½ hours. Another portion of this solution is manually wet-spun into a 50% aqueous ethylene glycol precipitating bath, while the remaining portion is precipitated in water, filtered, washed with water, and dried in a vacuum oven at 80° C. overnight. This sample has an inherent viscosity of 0.88 in dimethylsulfoxide and a polymer melt temperature of 160° C. The film could be drawn 3 times its original length at 90° C. on a hot surface. The wet-spun yarn was extracted in water, dried in air, and drawn to 6 times its original length on a hot surface at 125° C. This yarn has a very high orientation as determined by X-ray.

Example II

An experiment similar to that described in Example I is carried out using about 0.05 gram of cupric chloride as catalyst instead of triethylamine. A viscous solution resulted which was stable for 2 hours; however, after this period, solid particles begin to separate. The polymerization solution is precipitated in water, and the polymer isolated as previously described. This product has an inherent viscosity in dimethylsulfoxide of 1.10.

Example III

Dimethylglyoxime in the amount of 2.90 grams is dissolved in 25 ml. of dimethylsulfoxide. To this solution is added a solution of 6.25 grams of methylene bis(4-phenyl isocyanate) in 25 ml. of dimethylsulfoxide, and 2 ml. of triethylamine. The solution becomes viscous immediately upon addition of the amine. Stirring is continued for one hour while the solution is blanketed with nitrogen and heated to a temperature of 110° C. A clear coherent film is cast from a portion of the solution, the remainder of which is then diluted with water to precipitate the polymer. After filtering the solid polymer, it is washed and dried, yielding a light tan powder having a polymer melt temperature of 190° C.

Example IV

To a solution of 2.90 grams of dimethylglyoxime in 25 ml. of dimethylsulfoxide is added a solution of 7.40 grams of 3,3'-dimethoxy-4,4'-biphenylene diisocyanate in 30 ml. of dimethylsulfoxide, followed by 2 ml. of triethylamine. On addition of amine, the solution becomes cloudy and does not clarify upon heating to a temperature of 110° C. with stirring under nitrogen. After heating for 1½ hours, the suspension is poured into 200 grams of water and a solid product is removed by filtration. Following washing and drying, the polymer is a light tan substance which decomposes at a temperature of 260° C. without melting.

Example V

A solution of 2.93 grams of biphenylene diisocyanate in 15 ml. of dimethylformamide is mixed with 1.76 grams of 1,4-cyclohexanedione dioxime in 10 ml. of dimethylformamide at a temperature of between 80 and 100° C. An immediate reaction takes place and the solution rapidly becomes viscous. After approximately ½ hour, the solution, which is somewhat cloudy, is poured into water and the polymer is isolated by filtration. It is ground up, washed thoroughly with water, and dried in a high vacuum. The dry polymer is easily soluble in dimethylsulfoxide. It has an inherent viscosity of 0.81 in the solvent and can be cast to a clear, tough film. A solution of the polymer can be extruded from a mechanically driven syringe into 50% aqueous dimethylformamide contained in a long steel trough. Fiber is wound up easily on a mechanical wind-up. The yarn is amorphous, but becomes fairly tough after drawing.

Example VI

To a solution of 2.13 grams of 1,4-cyclohexanedione dioxime in 15 ml. of dimethylsulfoxide is added 3.75 grams of methylene bis(4-phenyl isocyanate) dissolved in 15 ml. of dimethylsulfoxide, followed by 2 ml. of triethylamine. The resulting solution is heated with stirring under nitrogen to a temperature of 100° C. for about 2 hours. After this period, a clear, coherent film is cast from the solution. The solid polymer is isolated by pouring the reaction mixture into water, removing the polymer by filtration, washing in water, and drying. The resulting light tan powder exhibits a polymer melt temperature of 210° C.

Example VII

To a solution of 2.13 grams of 1,4-cyclohexanedione dioxime in 15 ml. of dimethylsulfoxide is added a solution of 4.44 grams of 3,3'-dimethoxy-4,4'-biphenylene diisocyanate in 15 ml. of dimethylsulfoxide, followed by 2 ml. of triethylamine. The resulting solution is heated with stirring under nitrogen to a temperature of 110° C., and in about 20 minutes it becomes cloudy. Following 1½ hours of heating, the polymer is isolated by pouring the solution into water and filtering the solid polymer. It is washed with water and dried, yielding a light brown solid whose polymer melt temperature is 220° C.

Example VIII

To a solution of 5.04 grams of hexamethylene diisocyanate in 25 ml. of dimethylsulfoxide is added with stirring 4.26 grams of 1,4-cyclohexanedione dioxime dissolved in 25 ml. of dimethylsulfoxide. The resulting clear, colorless solution is stirred at a temperature of 100 to 120° C. The solution becomes somewhat cloudy and viscous after 10 to 15 minutes. Stirring and heating are continued for 1½ hours, and the suspension is poured into 300 grams of water. A precipitate settles out on standing overnight, and is removed by filtration, washed with water, and dried in a vacuum oven at a temperature of 110° C. The resulting light tan powder exhibits a polymer melt temperature of 240° C.

Example IX

To a solution of 1.64 grams of terephthaldehyde dioxime in 10 ml. of dimethylsulfoxide is added a solution of 2.5 grams of methylene bis(4-phenyl isocyanate) in 10 ml. of dimethylsulfoxide. As a catalyst, 1 ml. of triethylamine is added. The resulting solution is heated at a temperature of 110° C. with stirring under nitrogen for 2 hours. From this solution a coherent film may be cast. The polymer is isolated by precipitation with water, followed by filtration. It is washed and dried to yield a yellow solid having a polymer melt temperature of 170° C.

Example X

Terephthaldehyde dioxime in the amount of 1.64 grams is dissolved in 7 ml. of dimethylsulfoxide, and to this solution is added with stirring 1.68 grams of hexamethylene diisocyanate in 8 ml. of dimethylsulfoxide. The resulting solution is heated with stirring under nitrogen at a temperature of 120° C. for 2½ hours. Upon cooling, the solution turns cloudy, and by pouring the suspension into water the polymer is precipitated. It is removed by filtration, washed with water, and dried under vacuum. The resulting product has a polymer melt temperature of 110° C.

Example XI

In a 3-necked flask equipped with a stirrer and outlet tube and a nitrogen inlet are placed 8.25 grams of pyridine-2,6-dialdoxime, followed by 50 ml. of dimethylsulfoxide. A solution of 12.5 grams of methylene bis-(4-phenyl isocyanate) in 50 ml. of dimethylsulfoxide is added with stirring. No reaction occurs until 1 ml. of triethylamine is added, following which the solution becomes viscous. After 24 hours, the solution is poured into water and the solid polymer is filtered, washed and dried. It is soluble in cold dimethylsulfoxide and in cold N-methylpyrrolidone. The product has a polymer melt temperature above 320° C. and an inherent viscosity in N-methylpyrrolidone of 0.12.

Example XII

To a solution of 1.42 grams of 1,2-cyclohexanedione dioxime in 50 ml. of dimethylsulfoxide is added 2.50 grams of methylene bis(4-phenyl isocyanate) and 1 ml. of triethylamine. The resulting clear solution is heated under nitrogen with stirring for 3 hours at a temperature of 100° C. During this time the solution becomes yellow in color. The polymer is isolated by pouring the solution into 200 ml. of water.

Example XIII

To a solution of 1.42 grams of 1,2-cyclohexanedione dioxime in 30 ml. of dimethylsulfoxide is added, with stirring under nitrogen, a solution of 1.68 grams of hexamethylene diisocyanate in 10 ml. of dimethylsulfoxide. Triethylamine, in the amount of 1 ml., is added as a catalyst. The resulting clear solution is heated to a temperature of 100° C. for 3 hours, during which time the solution becomes yellow in color. Upon dilution with 300 grams of water, an infilterable suspension results.

The polymers of this invention are of value in the formation of shaped structures of various kinds. Of particular value are films and filaments formed from the polymers of diisocyanates and dioximes. They may exhibit a variety of properties, depending upon the choice of starting materials. The films and fibers are generally of high tenacity and high crystallinity and are frequently high melting. These qualities may be well utilized in various end-use applications. In the form of filaments, the polymers are characterized by a high capacity for being drawn and find utility in generally recognized fiber applications, i.e., in yarns, cords, fabrics, etc. Wrapping, covering, and protective purposes, as well as other similarly well-known uses, may be filled by the films prepared from the polymers of this invention.

I claim:

1. Novel polymeric composition consisting of recurring structural units of the formula:

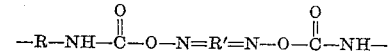

wherein R is a divalent organic radical selected from the group consisting of aliphatic, cycloaliphatic, or aromatic and R' is a tetravalent organic radical selected from the group of radicals consisting of:

(a) 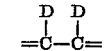

(b) 

(c) 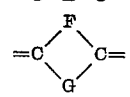

wherein D is selected from the group consisting of hydrogen and a monovalent organic radical, E is a radical selected from the group consisting of aliphatic, aromatic, aliphatic-aromatic and heterocyclic, F and G being divalent organic radicals which, taken with the two carbonyl carbon atoms, form a cyclic structure, said polymeric composition having an inherent viscosity of at least about 0.2.

2. A shaped article comprising the polymeric composition of claim 1.

3. A film comprising the polymeric composition of claim 1.

4. A fiber comprising the polymeric composition of claim 1.

5. A spinning solution comprising the polymeric composition of claim 1 in dimethylsulfoxide.

6. The process for preparing a novel polymeric composition having an inherent viscosity of at least about 0.2 comprising reacting a diisocyanate selected from the group consisting of aliphatic, cycloaliphatic and aromatic diisocyanates with a dioxime containing one of the tetravalent radicals selected from the group consisting of (a) 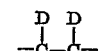

(b) 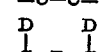

(c) 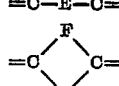

wherein D is selected from the group consisting of hydrogen and a monovalent organic radical, E is a radical selected from the group consisting of aliphatic, aromatic, aliphatic-aromatic, and heterocyclic, F and G being divalent organic radicals which, taken with the two carbonyl carbon atoms, form a cyclic structure, said reaction taking place at a temperature of from about room temperature to about 130° C. in a solvent for both reactants.

7. The process of claim 6 wherein the solvent is dimethylsulfoxide.

8. A spinning solution comprising the polymeric composition of claim 1 in a suitable organic solvent.

No references cited.